(12) United States Patent
Pilz et al.

(10) Patent No.: US 11,072,082 B2
(45) Date of Patent: Jul. 27, 2021

(54) SAFETY SYSTEM FOR SAFEGUARDING COOPERATIVE OPERATION OF PEOPLE, ROBOTS AND MACHINES

(71) Applicant: PILZ GMBH & CO. KG, Ostfildern (DE)

(72) Inventors: Thomas Pilz, Ostfildern (DE); Hansjürgen Horter, Ostfildern (DE); Matthias Holzäpfel, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 380 days.

(21) Appl. No.: 16/142,340

(22) Filed: Sep. 26, 2018

(65) Prior Publication Data
US 2019/0105788 A1    Apr. 11, 2019

(30) Foreign Application Priority Data
Oct. 6, 2017    (DE) .................... 10 2017 123 295.8

(51) Int. Cl.
*G06F 17/00* (2019.01)
*B25J 19/06* (2006.01)
(Continued)

(52) U.S. Cl.
CPC .............. *B25J 19/06* (2013.01); *B25J 9/1674* (2013.01); *B25J 9/1676* (2013.01); *B25J 19/023* (2013.01);
(Continued)

(58) Field of Classification Search
CPC ........ B25J 19/06; B25J 9/1676; B25J 9/1674; B25J 19/023; G05B 19/41895;
(Continued)

(56) References Cited

U.S. PATENT DOCUMENTS 5,276,777 A * 1/1994 Hara ...................... G05B 19/42
                                                                 700/252
5,465,037 A * 11/1995 Huissoon ............... B25J 9/1684
                                                                 318/568.11
(Continued)

FOREIGN PATENT DOCUMENTS

DE          10324628 A1   12/2004
DE    102004038906 A1 *   3/2006  .............. F16P 3/144
(Continued)

OTHER PUBLICATIONS

Hokuyo Automatic Co., Ltd., Osaka—User Manual: Hokuyo Safety Laser Scanner UAM-05LP-T301; exact date unknown, but at least prior to Oct. 2017.7 pp.

*Primary Examiner* — Ronnie M Mancho
(74) *Attorney, Agent, or Firm* — Harness, Dickey & Pierce, P.L.C.

(57) ABSTRACT

A safety system for safeguarding cooperative operation of people, robots, and machines with respect to a technical installation includes a safety-related device. The safety-related device is configured to monitor a first hazardous area of the technical installation and bring the technical installation into a safe state in response to detection of a hazardous condition. The safety system is configured to identify an autonomously operating technical unit, register the autonomously operating technical unit in response to the autonomously operating technical unit satisfying a defined condition, and restrict monitoring of the first hazardous area by the safety-related device in response to the registration. The safety system is configured to, in response to a defined event, revoke the registration of the autonomously operating technical unit and lift the restriction on monitoring.

23 Claims, 5 Drawing Sheets

(51) Int. Cl.
 *G05B 19/418* (2006.01)
 *G05B 19/4061* (2006.01)
 *B25J 9/16* (2006.01)
 *F16P 3/14* (2006.01)
 *B25J 19/02* (2006.01)
 *G05D 1/02* (2020.01)

(52) U.S. Cl.
 CPC .......... *F16P 3/144* (2013.01); *G05B 19/4061* (2013.01); *G05B 19/41895* (2013.01); *G05D 1/0214* (2013.01)

(58) Field of Classification Search
 CPC ....... G05B 19/4061; F16P 3/144; F16P 3/142; F16P 3/147; F16P 3/12; Y02P 90/60; Y02P 90/02; G05D 1/0214; G05D 1/0223; G05D 1/0236; G05D 1/024; G05D 1/0242; G05D 1/0251; G05D 1/0257; G05D 1/0276; G05D 1/028; G05D 2201/0212
 USPC ......................................................... 700/245
 See application file for complete search history.

(56) References Cited

U.S. PATENT DOCUMENTS

| | | | | |
|---|---|---|---|---|
| 7,209,801 | B2 * | 4/2007 | Anfindsen | B25J 9/1664 |
| | | | | 318/568.2 |
| 7,734,358 | B2 * | 6/2010 | Watanabe | G05B 19/425 |
| | | | | 700/61 |
| 9,910,186 | B2 * | 3/2018 | Stein | G01V 8/20 |
| 10,056,010 | B2 * | 8/2018 | Salsich | B23K 9/0953 |
| 10,108,194 | B1 * | 10/2018 | Russell | G05D 1/0212 |
| 10,112,299 | B2 * | 10/2018 | Hiro | B25J 9/1664 |
| 10,175,683 | B2 * | 1/2019 | Yamanaka | B25J 9/163 |
| 10,427,239 | B2 * | 10/2019 | Becker | B23K 9/0953 |
| 10,473,447 | B2 * | 11/2019 | Mathkar | B23K 9/1276 |
| 10,496,080 | B2 * | 12/2019 | Daniel | B23K 9/0953 |
| 10,654,172 | B2 * | 5/2020 | Iida | B25J 13/085 |
| 10,710,240 | B2 * | 7/2020 | Atohira | G05B 19/4097 |
| 10,737,387 | B2 * | 8/2020 | Du | B25J 9/1638 |
| 2005/0222713 | A1 * | 10/2005 | Kawabe | B25J 19/027 |
| | | | | 700/259 |
| 2006/0052901 | A1 * | 3/2006 | Nihei | B25J 9/1674 |
| | | | | 700/245 |
| 2013/0184980 | A1 * | 7/2013 | Ichikawa | B25J 9/1676 |
| | | | | 701/301 |
| 2015/0158178 | A1 * | 6/2015 | Burmeister | B25J 9/1697 |
| | | | | 382/203 |
| 2017/0136902 | A1 * | 5/2017 | Ricci | B60L 53/36 |
| 2017/0144307 | A1 * | 5/2017 | Rublee | G06Q 10/08 |

FOREIGN PATENT DOCUMENTS

| | | | | |
|---|---|---|---|---|
| DE | 102010028292 | A1 | 11/2011 | |
| DE | 102010046327 | A1 | 3/2012 | |
| DE | 102012215369 | A1 * | 3/2014 | ............ B65H 43/00 |
| DE | 202018101285 | U1 * | 6/2019 | .............. G01V 8/20 |
| DE | 102018122263 | A1 * | 3/2020 | ........... G01S 17/931 |
| EP | 1793244 | A2 | 6/2007 | |
| EP | 1901150 | A1 | 3/2008 | |
| WO | WO-2008131704 | A1 | 11/2008 | |
| WO | WO-2012041549 | A2 * | 4/2012 | ............ G06Q 10/08 |
| WO | WO-2014008929 | A1 | 1/2014 | |
| WO | WQ-2019081135 | A1 * | 5/2019 | ........... G05B 19/042 |

\* cited by examiner

SAFETY SYSTEM FOR SAFEGUARDING COOPERATIVE OPERATION OF PEOPLE, ROBOTS AND MACHINES

CROSS-REFERENCES TO RELATED APPLICATIONS

This application claims priority from German patent application DE 10 2017 123 295.8 filed on Oct. 6, 2017. The entire content of the priority application is incorporated herein by reference.

BACKGROUND OF THE INVENTION

The present invention relates to a safety system for safeguarding cooperative operation of people, robots and machines with respect to a technical installation In general, technical installations such as machines, robots or entire production systems must be secured with suitable facilities so that there is no danger to people or objects in the vicinity of the technical installation during operation. To achieve this, a technical installation is usually equipped with safety-related devices that monitor a hazardous area of the technical installation and take suitable measures if a hazardous situation is detected.

The requirements for a technical installation and its safety are specified in Europe, for example by the Machinery Directive (2006/42/EC). Accordingly, a manufacturer of a machine must carry out a risk assessment in order to identify all hazards associated with his machine in order to design the machine on the basis of this information. In this context, safety-related devices include safety circuit arrangements which include sensors for monitoring a hazardous area and suitable means for transferring a technical installation into a safe state. In the most basic way, a switching device de-energizes a technical installation as soon as a hazardous condition is detected by the sensor, so that no more danger emanates from the machine.

The requirements for safety-related facilities are very high and partly contrary to the functional requirements of the technical installation. Thus, on the one hand, the safety-related device must ensure that the technical installation is transferred to a safe condition for every assumed hazardous situation, while at the same time the use of the safety-related device must not lead to the availability being reduced due to false shutdowns in cases where there is no hazardous situation at all.

Another aspect that needs to be taken into account is that in addition to people there are more and more other actors working with the technical installations. These are autonomously operating technical units that act independently on their own and have to work together like a person with a technical system. Examples of such units are vehicles of an automated guided vehicle system (AGV) or autonomously operating robots which, like humans, can move freely around the technical installation and interact with it.

Usually a safe cooperation between people, technical systems and autonomously working units is realized by fixed installations, such as fences or barriers, or by firmly defined driveways, which the autonomously working units are not allowed to leave. The spatial separation of the individual actors can prevent a danger for the operator of a technical installation, from this or the other actors. However, this approach means that autonomous units are significantly restricted in their autonomous behavior and are regularly unable to fully exploit their potential. Likewise, permanently installed safety devices severely restrict the possibilities of changing a technical installation or adapting it to changed conditions.

It is therefore desirable to enable a genuine co-existent and cooperative operation of people, machines and autonomously working units, whereby cooperation should be as flexible as possible but at the same time safe in accordance with the relevant guidelines and standards.

SUMMARY OF THE INVENTION

It is therefore an object of the present disclosure to specify a safety system that allows a coexistence of machines, people and autonomously working units. Further, it is an object to enable flexible cooperation and at the same time guarantee sufficient safety without restricting the availability of a technical installation.

According to one aspect of the present disclosure, this object is achieved by a safety system for safeguarding cooperative operation of people, robots and machines with respect to a technical installation, comprising a first safety-related device which is configured to monitor a first hazardous area of the technical installation and to bring the technical installation into a safe state if a hazardous condition is detected, wherein the safety system is configured to identify an autonomously operating technical unit and to register the autonomously operating technical unit when it satisfies a defined condition, and to restrict monitoring of the first hazardous area by the first safety-related device in response to the registration.

According to another aspect, this object is achieved by a Method for safeguarding cooperative operation of people, robots and machines with respect to a technical installation, comprising the steps of:

Providing a first safety-related device for monitoring a hazardous area of the technical installation;

Monitoring the first hazardous area for a hazardous condition;

Bringing the technical installation into a safe state when the hazardous condition has been detected;

Identifying an autonomously operating technical unit;

Registering the autonomously operating technical unit when the autonomously operating technical unit satisfies a defined condition; and Restricting monitoring of the first hazardous area by the first safety-related device in response to registration of the autonomous technical unit.

It is therefore an idea of the present disclosure to design a safety system in such a way that it recognizes an autonomously operating technical unit and cooperates with it by restricting the safety-related devices in such a way that the occurrence of the autonomously operating technical unit in the hazardous area of the technical installation does not lead to the shutdown of the technical installation, but at the same time safeguarding by the safety-related device can still be guaranteed.

Identifying the autonomously operating technical unit involves, on the one hand, recording the unit in a defined area in the environment of the technical installation and, on the other hand, identifying which or what kind of unit it is.

In this context, registration means establishing privileges for the identified unit in relation to the security-related device. Registration thus corresponds to a login of the autonomously working unit to the safety system, so that it can set up the safety-related devices in such a way that cooperation between the autonomously working unit and the technical installation is possible. In this way, for example, the flow of material to the technical installation can be made possible in a simple manner, while at the same time, under certain conditions, human access to the installation remains unrestricted. This means that the safety system can still allow people to access the technical installation and guarantee safeguarding by the first safety-related device.

Restricting monitoring can include various measures. For example, the limitation may include disabling sensors or functions of the safety-related device. In addition, the limitation may include other control measures, such as setting a maintenance mode at lower speed, or activating other safety devices that allow end protection during the limited monitoring.

The inventive safety system thus allows people and autonomously working units to coexist on a technical installation without restricting availability or compromising safety. The safety system can thus enable people and autonomously working units to work together on a technical installation in a simple and safe manner. At the same time, the autonomously operating units are neither restricted in their free operation nor are fixed installations required to spatially separate the autonomously operating units and the operators of an installation.

In an preferred refinement, the first safety-related device comprises a sensor means for detecting persons in the first hazardous area and the safety system is configured to identify the autonomously operating technical unit by means of the sensor means.

In this refinement, the safety system thus uses the existing sensors of the safety-related devices of the technical installation to identify an autonomously operating unit. For example, the safety-related device can include a three-dimensional safety camera system which is designed not only to detect a hazardous condition but also to detect and evaluate elements as a unit. The advantage of this is that the safety system can utilize existing sensors without having to add new sensors to the system. Thereby, the costs for an inventive safety system can be reduced advantageously.

In a preferred refinement, the safety system is configured to assign with the identification an identifier to the autonomously operating technical unit.

In this refinement, the safety system not only recognizes and records the autonomously operating unit, but also assigns it an identifier, in particular a unique identifier. In this way, the safety system can easily process the information on the autonomously working unit, for example to carry out a subsequent authentication process.

In a further refinement, the safety system comprises a communication interface for communication with the autonomously operating technical unit and the safety system is configured to receive an identifier of the autonomously operating technical unit via the communication interface to identify the autonomously operating technical unit.

In this refinement, the safety system thus comprises a communication interface with which at least unidirectional communication is possible from the autonomously operating technical unit to the safety system. Via the communication interface, the autonomously operating unit can provide the safety system with an identifier for identification, which makes it easy to identify the autonomously operating technical unit in the environment of the technical installation. Bidirectional communication is preferred so that, in addition to identification, further data can be exchanged between the autonomously operating unit and the safety system.

In a preferred refinement, the communication interface is a wireless interface. Communication between the autonomously operating unit and the safety system can be made particularly easy and flexible via the radio interface. For example, safe communication via an RFID interface can be implemented simply and cost-effectively. The design thus contributes to the flexibility of the system and at the same time to a cost-effective implementation.

In a further preferred refinement, the safety system is configured to check the defined condition by means of the identifier.

In this refinement, registration is thus based on the unique identifier. In other words, the identifier is part of an authentication process with which an autonomously operating unit logs on to the safety system. This process can be implemented particularly easily using a unique identifier.

In a further refinement, the safety system is configured to revoke the registration of the autonomously operating technical unit based on a defined event and to lift the restriction on monitoring.

In this refinement, it is possible not only to register but also to unregister the autonomously operating technical unit. This means that an autonomously operating technical unit can not only log on to the system, but can also actively log off or be logged off from the system, whereupon the restriction on monitoring is also removed. This configuration thus makes an advantageous contribution to increasing flexibility by enabling dynamic cooperation between the autonomously operating unit and the technical installation or the safety-related equipment of the technical installation.

In a preferred refinement, the defined event is the expiry of a defined time period, a logoff of the autonomously operating technical unit from the safety system, and/or a withdrawal of the autonomously operating technical unit from the first hazardous area of the technical installation.

In this refinement, the logoff process can thus be triggered by various events. For example, an autonomously working technical unit can only be granted temporary local access, whereby the access authorization expires automatically after a defined period of time. Alternatively or in addition, an autonomous technical unit may also actively log off from the safety system to indicate that it is terminating cooperative operation. This logoff can also take place by the autonomous working unit moving away from the hazardous area of the technical installation. It goes without saying that the various options can also be combined. In this way, the flexibility of cooperation can be further increased.

In a further refinement, the autonomously operating technical unit comprises a second safety-related device configured to monitor a second hazardous area of the autonomously operating technical unit.

In this refinement, the autonomously operating unit has one or more of its own safety-related devices to safeguard a hazardous area around the autonomously operating unit. For example, an autonomously operating technical unit, such as a driverless transport vehicle, can have its own safety devices such as a person recognition system (collision protection) or emergency stop devices for actively stopping the vehicle in an emergency situation. In other words, the autonomous unit may be a technical unit that is safeguarded in a similar way to the technical installation itself. The second safety-related device is a second independent safety device outside the safety system. Cooperation between the first and second safety-related devices, which can be implemented by the safety system, can further increase the safety of the technical installation.

In further preferred refinement, the second safety-related device comprises at least one signaling device for signaling a hazardous condition in the second hazardous area. The second safety-related device thus comprises either sensors for monitoring the hazardous area, such as radar or laser sensors or a safe camera system, or a signaling device with which a hazardous situation can be actively indicated, such as a classic emergency stop button.

In a further preferred refinement, the safety system is configured, when the first safety-related device is restricting the monitoring of the first hazardous area of the technical installation, to receive a signal representing a hazardous condition in the first hazardous area from the second safety-related device of the autonomously operating technical unit, in order to bring the technical installation into a safe state, when a hazardous condition is detected.

In this refinement, the first safety-related device and the second safety-related device work together to safeguard the hazardous area around the technical installation. This means that the safety system combines the safety-related devices of the technical installation and the autonomously operating technical unit in the area of the technical installation in order to ensure reliable monitoring of the hazardous area. In this way, even if monitoring is restricted by the first safety-related device of the technical installation, reliable monitoring of the entire hazardous area can be ensured by the safety system using the second safety-related devices of the autonomously operating technical unit in the vicinity of the technical installation for monitoring. This design not only increases the flexibility of the system, but also improves the safety of people in the hazardous area of the technical system, while maintaining a high level of availability.

In a further preferred refinement, the safety system comprises another safety-related device for bringing the technical installation into a safe state.

In this refinement, the safety system thus has another safety-related device which is independent of the first and/or the second safety-related device in order to bring the technical installation into a safe state, in particular to switch it off. For example, the safety system can have its own safe outputs that act on contactors in a power supply of the technical installation in order to shut it down. The safety system is thus designed to bring about safety independently. The configuration thus contributes to a further increase in the safety of the technical installation.

In an alternative or complementary refinement to this, the safety system is configured to transmit the signal of the second safety-related device to the first safety-related device in order to transfer the technical installation into a safe state.

In this refinement, the safety system thus uses the first safety-related device to bring the technical installation into a safe state. In other words, when the second safety-related device of the autonomously operating unit detects a hazardous condition and reports it to the safety system, it uses the (restricted) first safety-related device to perform an appropriate safety function, such as shutting down the technical installation. For example, the safety system uses the safety switching devices of the first safety-related device to switch off the technical installation. The design makes an advantageous contribution to implementing the inventive safety system at low cost by allowing existing components to be reused.

In a further refinement, the first safety-related device comprises at least one non-restrictable device which is configured to monitor the first hazardous area even after registration of the autonomously operating technical unit.

In this refinement, even if the first safety-related device is restricted, at least one device remains that can guarantee final safety. This means that the first safety-related device has at least two devices for monitoring the hazardous area, with at least one device remaining active during the restriction. In this way, a minimum level of safety can always be guaranteed, which can increase the safety of the technical installation.

In a further refinement, the non-restrictable device is a tactile detection and/or near-field protection.

In this refinement, the final safety function is thus implemented as contact detection via tactile sensors or as near-field protection via sensors with proximity-sensory capabilities. Both forms can preferably be implemented using a textile robotic skin that extends over the surface of the components of the technical installation that have to be safeguarded. The protection by the aforementioned methods is particularly suitable as final safety, as these generally allow the greatest possible freedom of movement in front of the technical installation without restricting the movement of the technical installation itself. The design thus makes an advantageous contribution to increasing safety and flexibility in the cooperative operation of man and machine.

In a further preferred refinement, the non-restrictable device is in an inactive state when the first safety-related device is in an unrestricted state.

In this refinement, the non-restrictable device is therefore only active if the first safety-related device is restricted by the safety system and is preferably switched off. This has the advantage that the final safety function is only active when it is actually needed, i.e. in a state in which the usual monitoring by the safety-related device is suspended. On the one hand, this saves energy and, on the other hand, this design can increase availability, since the usually more sensitive end safety measures cannot lead to faulty shutdown if the hazardous area is already monitored by other systems.

In a further refinement, the first safety-related device is configured to divide the first hazardous area into a first area and a second area, and the safety system is further configured to restrict monitoring of the first hazardous area in the first area or in the second area.

In this refinement, the first hazardous area can thus be divided into sub-areas that can be managed independently of the safety system. This means that the first safety-related device has sensors that allow the hazardous area to be divided, for example by means of configurable safety zones of a three-dimensional safety camera unit or by using a large number of individual sensors that monitor different areas. The safety system can then restrict the detection of a hazardous condition to certain areas. This design contributes advantageously to a further increase in flexibility and at the same time to increased safety.

In preferred refinement, the safety system is configured to detect a position of the autonomously operating technical unit and to restrict the monitoring of the first danger zone in the first area or in the second area depending on the position of the autonomously operating technical unit.

In this refinement, monitoring is thus made more dynamic. This means that depending on the position of the autonomously working unit, monitoring is only restricted for the area in which the autonomously working technical unit is actually located. The dynamisation increases flexibility and safety at the same time.

In a further refinement, the autonomously operating technical unit is a vehicle of an automated guided vehicle system (AGV).

A driverless transport system is an internal, floor-bound transport system with automatically guided vehicles whose primary task is to transport materials. In particular, the transport system is independent of the control of a technical installation operated by the transport system. The control of the technical installation and the control of the transport system thus coexist, whereby the safety system enables cooperation between the two systems.

In a further refinement, the autonomously operating technical unit is a person who can identify himself as an autonomously operating technical unit using technical means.

In this refinement, a person working in the environment of the technical installation can present himself as an autonomous, working technical unit, for example by means of an RFID card, and thus also lead to an automatic restriction of monitoring. In this way, cooperation between machines and people can also be made possible in a simple but at the same time safe manner. It goes without saying that in such cases at least one final safety function must regularly remain active. If necessary, the technical system must also be switched to a maintenance mode at the same time, e.g. by reducing the working speed. The design makes an advantageous contribution to increasing flexibility and availability.

In a further refinement, the first safety-related device comprises at least one sensor, a switching device and an actuator which form a multi-channel, in particular a diverse structure.

In this refinement, the first safety-related device is thus a safety circuit arrangement that detects a hazardous condition via a sensor and controls an actuator via a switching device in order to act on the technical installation, in particular to shut it down. The safety circuit arrangement has a multi-channel structure, i.e. at least two channels as a redundant pair to prevent the failure of the safety-related devices. In addition, the structure is diverse in a preferred configuration, i.e. different parts are used in the channels, which perform the same function but have been produced by different manufacturers, for example, in order to rule out common cause errors. This measure can further increase safety.

In a further refinement, the safety system is designed as a logical function within a safety controller or as a distributed function of the first safety-related device.

In this refinement, the safety system can take different forms. In particular, the safety system may be designed as a dedicated device, for example as an independent controller or computer, or as a function on an existing control system, in particular in the form of a software solution. It is also conceivable that the safety system is a functional part of the safety-related device, with the safe sensors taking over the tasks of the safety system. This design thus contributes to an economical and application-oriented implementation of the safety system.

It will be understood that the features of the invention mentioned above and those yet to be explained below can be used not only in the respective combination indicated, but also in other combinations or in isolation, without leaving the scope of the present invention.

BRIEF DESCRIPTION OF THE DRAWINGS

Exemplary embodiments of the invention are explained in more detail in the following description and are represented in the drawings, it shows.

DESCRIPTION OF PREFERRED EMBODIMENTS

Figure 1:
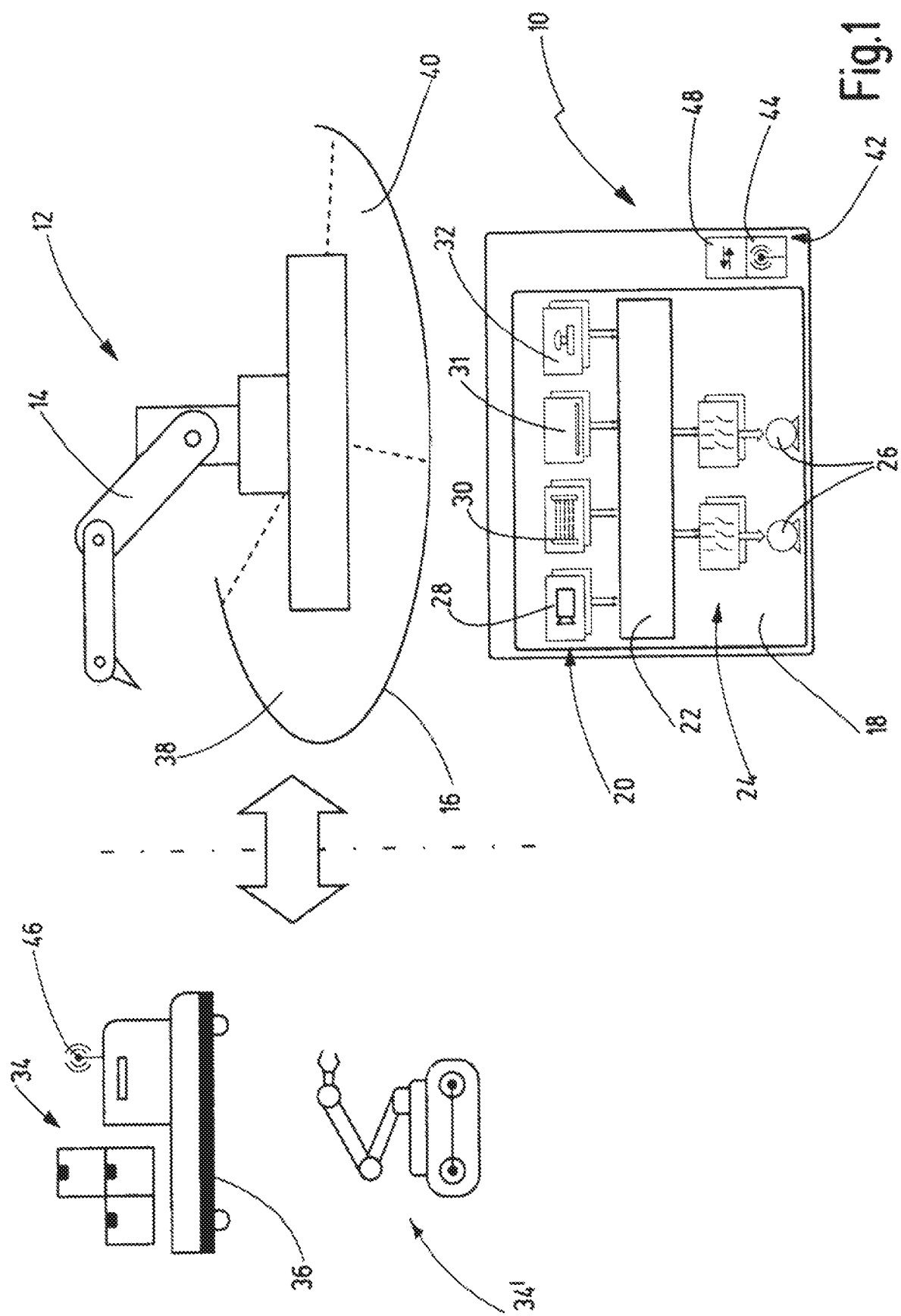
FIG. 1 illustrates a schematic representation of an exemplary embodiment of the new safety system.

In FIG. 1 the new safety system in its entirety is denoted by the reference numeral 10. The safety system 10 serves to ensure the cooperative operation of people, robots and machines on a technical installation 12. The technical installation 12 is represented here by a robot 14, whose movement area defines a first hazardous area 16 of the technical installation 12.

Safety system 10 has a first safety-related device 18 to safeguard the first hazardous area 16 of technical installation 12. The first safety-related device 18 can comprise a multitude of safe sensors 20, a control unit 22 and safe outputs 24. The safe sensors 20 monitor the first hazardous area 16 and generate corresponding signals which are evaluated by the control unit 22 in order to control outputs 24, for example to shut down the drives 26 of the technical installation 12 in a hazardous situation.

The sensors 20 provide a suitable sensor system for detecting people and mobile units in the area surrounding the technical installation 12. Among other things, the sensors that can be used are: 3-dimensional safety camera systems 28, such as the SafetyEye distributed by the applicant, close-range sensors, for example on optical principles or radar technology, safety mats 31, laser scanners, infrared monitoring, light barriers 30, radiolocation and other safety devices without mechanical separation, such as contactless operating safety devices. In addition to sensor 20, the first safety-related device 18 may also include active signaling devices, such as emergency stop switches 32, which are triggered by a person in a hazardous situation.

In the exemplary embodiment shown here, triggering the sensors 20 or actuating the emergency stop switch 32 causes the drives 26 to be disconnected from a power supply and the robot 14 to be stopped, so that there is no longer any danger to a person in hazardous area 16 emanating from the robot 14. It goes without saying that in other exemplary embodiments the safety-related device 18 can also bring about a safe state in other ways. For example, performing suitable control of the robot 14 is conceivable instead of a switch-off. In another design example, the arm of the robot 14 can also be brought into a parking position in order to bring about a safe state.

Similarly, the first safety-related device 18 is not limited to the configuration shown here. A more complex safety controller with several control units to which sensors are connected and which communicate with each other via a communication network is also conceivable in order to ensure safeguarding of the technical installation 12. Conversely, it is also conceivable that the safety-related device 18 is merely composed of one or more safety circuit arrangements, each of which couples a sensor 20 to a switching device (not shown here) in order to bring about a safe state with the aid of a simple switching process.

The safety system 10 also has the means to identify an autonomous technical unit 34 in the environment of technical installation 12. An autonomously operating technical unit can in particular, as shown here, be a vehicle 36 of an automated guided vehicle system (AGV). Such a transport vehicle 36 (also called Automated Guided Vehicle) is a floor-bound transport vehicle with its own drive, which is automatically controlled and guided contactless. In particular, such a transport vehicle is used for transporting materials and is designed, for example, for pulling or carrying goods with active or passive load handling equipment.

It goes without saying that a driverless transport vehicle 36, as shown here, is only one example of an autonomously operating technical unit. Basically, autonomously operating technical units comprise all technical machines that have autonomous control and can operate independently in a workspace. In particular, an autonomously operating technical unit can also be a 34' robot that performs certain tasks independently in a defined area and it, or components of itself, can move freely.

The safety system 10 is configured to identify the autonomous technical unit 34. This means that the safety system 10 can sense and detect the unit 34 within a defined range. For this purpose, the safety system 10 preferably uses the existing sensors 20 of the first safety-related device 18, for example, the safety system 10 can fall back on a safety camera 28, which makes it possible to recognize the autonomously operating technical unit 34 as such in addition to the pure detection.

Recognition here means in particular that the safety system 10 can distinguish the autonomously working technical unit from a person or another object. It is conceivable, for example, that the safe camera 28 will recognize that unit as such on the basis of the contours of the autonomously operating technical unit 34. Alternatively or in addition, other sensors can also be involved in the identification, for example safety mats 31, which can determine not only the presence of a load but also its weight. In particular, several sensors can be used for identification in preferred exemplary embodiment in order to enable clear identification of the autonomously operating technical unit 34.

Once an autonomously operating technical unit 34 has been identified in the vicinity of the technical installation 12, the safety system 10 can register unit 34. Among other things, registration can include an authentication process that checks whether the autonomously operating technical unit 34 is allowed access to the technical installation 12. For example, the identification for the autonomously operating technical unit 34 can determine an identifier and the safety system uses the identifier and a list stored in a memory to check whether the autonomously operating technical unit may have access to technical installation 12. It goes without saying that in addition to this simple authentication, more complex logon procedures are also conceivable, which, for example, are based on cryptological processes and involve the exchange of certificates.

Regardless of the registration procedure used, after successful registration, the first safety-related device 18 restricts the monitoring of hazardous area 10 in whole or in part, so that the autonomously operating unit 34 can approach the technical installation without triggering the safety function, i.e. transferring the technical installation 12 to a safe state. In a preferred exemplary embodiment, only the components of the first safety-related device 18 that would be triggered by the autonomously operating unit 34 are switched off or deactivated. It goes without saying that in addition to deactivating individual components, other control measures are also conceivable. In particular, a restriction of monitoring can also consist of deactivating a main monitoring and activating suitable end safeguarding means.

In addition, it is conceivable that the safety system 10 will restrict the first safety-related device 18 by means of further parameters which are either known in advance to the safety system 10 or are communicated to it by the autonomously operating unit 34. For example, the first hazardous area 16 may be divided into sub-areas 38, 40 which are monitored independently by individual sensors 20, whereby the safety system 10 restricts the monitoring by the first safety-related device 18 only in selected areas 38, 40.

The safety system 10 can also store defined paths of movement which are linked to the autonomously operating units 34 via a defined identifier. In this way, the safety system 10 can restrict monitoring depending based on a location. Alternatively, in another exemplary embodiment, one of the safe sensors 20, for example a safe camera 28 or a spatially resolving safety mat 31, can also provide corresponding location information for the autonomously operating unit 34.

In a preferred exemplary embodiment, the safety system 10 has a communication interface 42, in particular a wireless interface 44, for communicating with the autonomously operating technical unit 34, which has a corresponding remote interface 46.

By means of direct communication with the autonomously operating technical unit 34, the safety system 10 can request an identifier and the autonomously operating technical unit may communicate its current position via the interface. In addition to direct communication with the autonomously operating technical unit, indirect communication is also possible, for example via a connection 48 with a master computer of the autonomously operating technical unit 34, in order to determine via the master computer the identifier and position of a unit 34. In this way, the relevant information can be transmitted without direct communication with unit 34.

A concrete example of an application scenario in which the new safety system is used is explained in more detail below with reference to FIG. 2.

Figure 2:
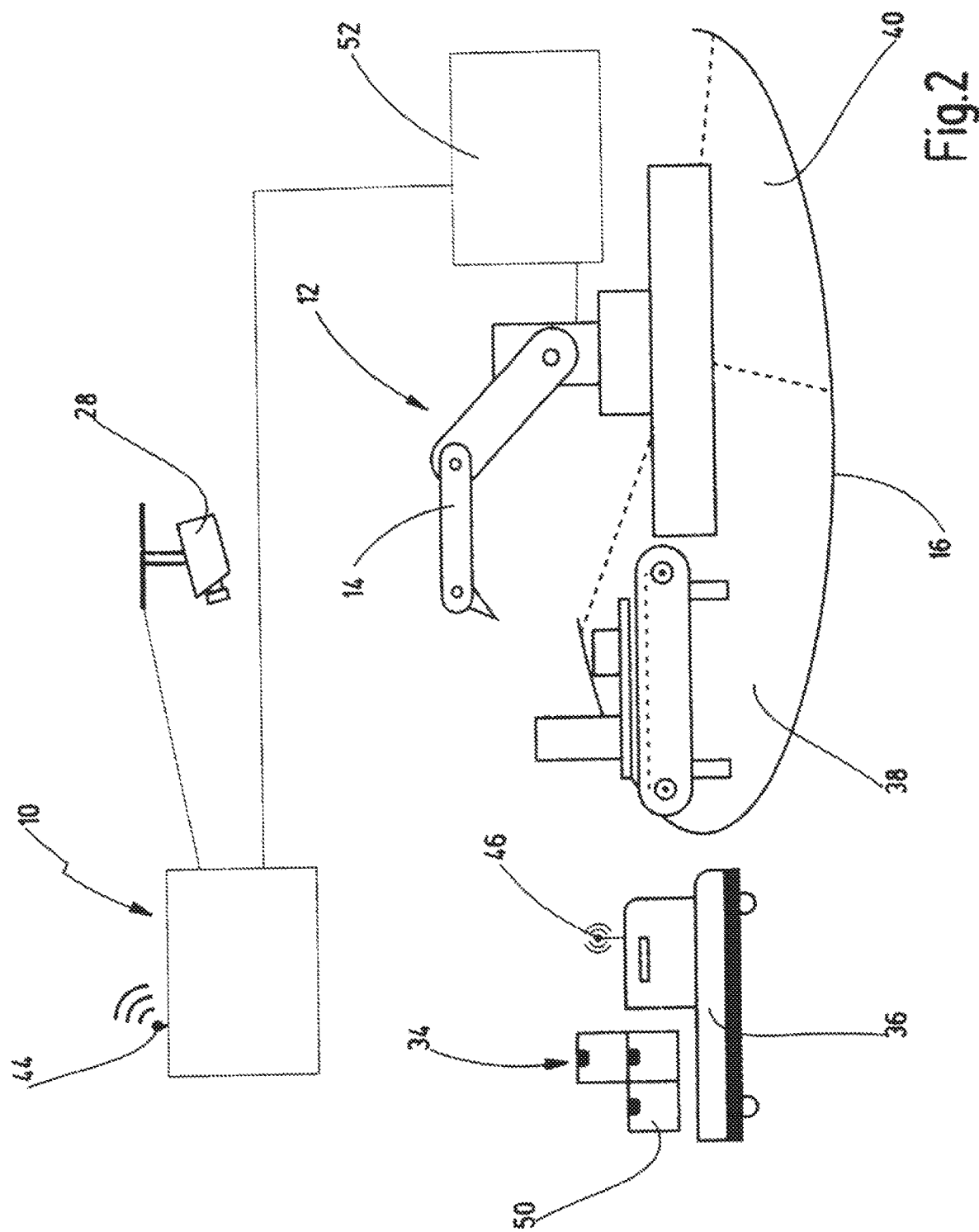
FIG. 2 illustrates an application scenario of an exemplary embodiment of the new safety system.

FIG. 2 uses a concrete example to show how cooperative operation can take place between a technical installation 12 and an autonomously operating technical unit 34. The same reference characters designate the same parts as before.

In this exemplary embodiment, the autonomously operating technical unit 34 is a driverless transport vehicle 36, which transports material 50 to a technical installation 12. The transport vehicle 36 can essentially move freely and independently in the surroundings of the technical installation 12. It is designed to convey material 50 to the technical plant 12 in such a way that a robot 14 of the technical installation 12 can take the material 50 from the transport vehicle 36 for further processing or deposit finished products on it. For this purpose, the transport vehicle 36 must be able to drive as close as possible to the technical installation 12, in particular into the moving range of the robot arm 14. The transport vehicle therefore inevitably enters a defined hazardous area 16 of technical installation 12.

The hazardous area (not explicitly denoted here) is monitored in this exemplary embodiment by a three-dimensional camera system 28. The three-dimensional camera system 28 is configured to define protected areas 38, 40 within the hazardous area 16 and to shut down robot 14 in the event of unauthorized access to these restricted areas. The three-dimensional camera system 28 is linked to a robot controller 52 via a safety system 10. Via the link the safety system 10 can transfer the robot 14 into a safe state. Alternatively, the safety system 10 could also be directly connected to the power supply of the robot 14 in order to de-energize the robot 14 in a hazardous situation.

The safety system 10 is coupled to a corresponding remote interface 46 of the transport vehicle 36 via a wireless interface 44. In the exemplary embodiment shown here, the transport vehicle 36 identifies itself via the wireless interface 44 with the safety system 10. In particular, the transport vehicle transmits an identifier to the safety system, on the basis of which the transport vehicle 36 can preferably be clearly identified. The transmission of the identifier can take place in a secure, if necessary encrypted way. Corresponding procedures for this are known from the state of the art.

After the transport vehicle 36 has identified itself, the safety system 10 can restrict the monitoring by the safe three-dimensional camera unit 28. For example, the safety system 10 can deactivate the monitoring of some of the defined areas 38, 40 of the three-dimensional camera system 28, so that the transport vehicle 36 can enter the hazardous area 16 of technical installation 12 without triggering the corresponding safety function.

The restriction of monitoring is preferably only temporary. In other words, the restriction only takes place as long as the transport vehicle 36 has to be in the hazardous area of technical installation 12. It is conceivable that the restriction is only suspended for a defined period of time within which the transport vehicle 36 must have completed its task at technical installation 12. After the defined period of time has elapsed, the safety system 10 removes the restriction on monitoring by the three-dimensional camera system 28 and the transport vehicle 36 is no longer considered to be registered with the safety system 10. In other words, registration of transport vehicle 36 has been revoked. If the transport vehicle 36 continues to be in the monitoring area of the three-dimensional camera system 28 at this time, the safety function will be triggered and the technical installation 12 would have to be transferred into a safe state.

In addition to a defined time period for removing the restriction, it is also conceivable that the transport vehicle 36 actively logs off from the safety system 10, whereupon it withdraws the registration. It is also conceivable that the three-dimensional camera system 28 recognizes that the transport vehicle 36 has withdrawn from the hazardous area, whereupon the safety system 10 also withdraws the registration of the transport vehicle 36 and lifts the restriction on monitoring. In this way, dynamic monitoring of the hazardous area 16 around the technical installation 12 is made possible by vehicles logging on and off and the safeguarded area is dynamically adapted accordingly.

In a preferred exemplary embodiment, the technical installation 12 also has additional sensors that enable final safeguarding of the technical installation 12. These sensors are preferably sensors that enable the detection of contact or near-field protection. In particular, such sensors are tactile sensors that are arranged directly on the surface of the technical installation 12 in order to detect a direct contact or an imminent contact (capacitive near-field sensors). With the help of these sensors, which are not deactivated during the restriction of the other safe sensors or are only activated during the restriction, final safeguarding is made possible, so that a person is effectively protected in the hazardous area 16 of technical installation 12 even if the monitoring is otherwise restricted. In a preferred exemplary embodiment the sensors for final safeguarding are textile sensors, which are arranged directly on the surface of the technical installation, and are also called robot skins.

Figure 3:
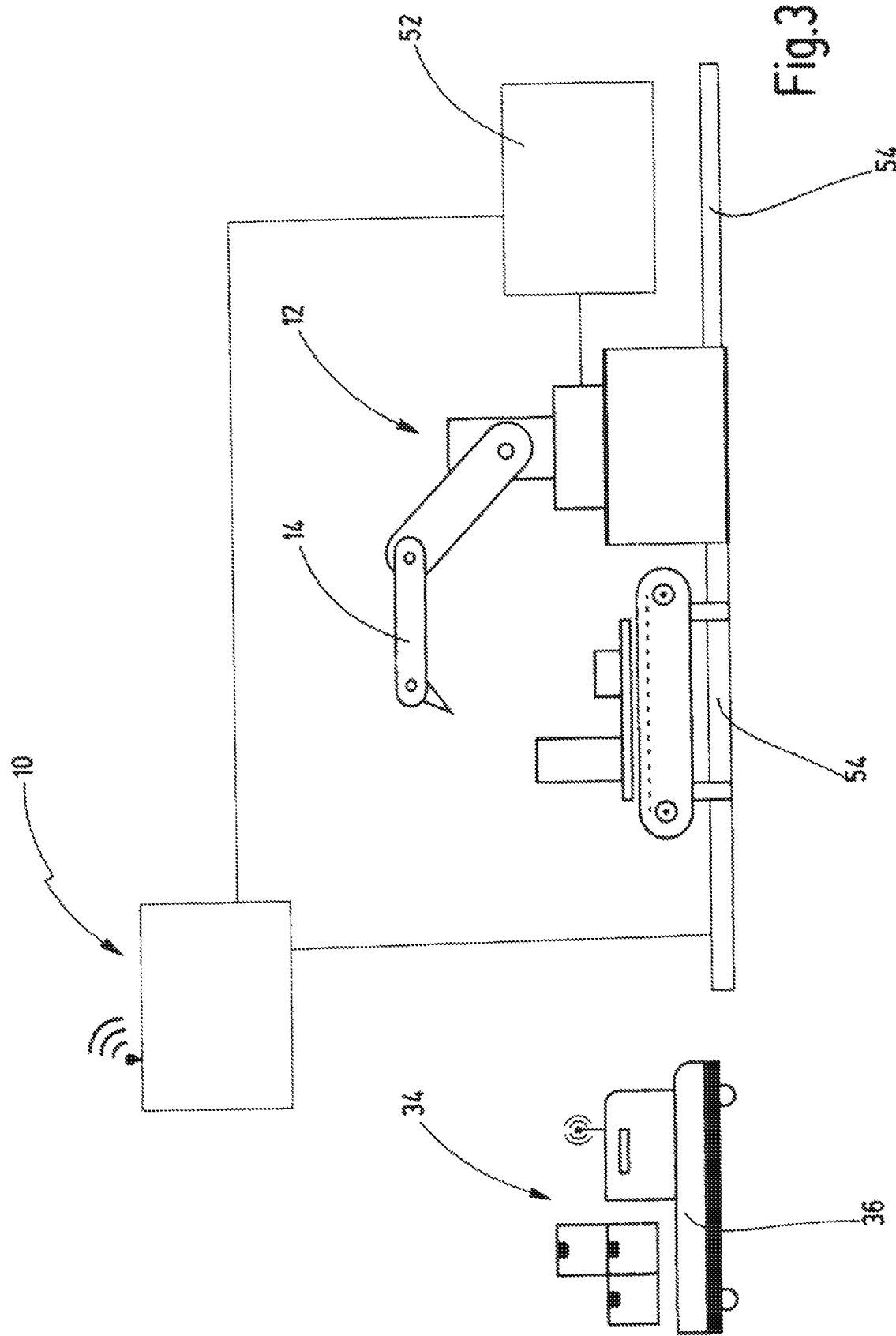
FIG. 3 illustrates a further application scenario of an exemplary embodiment of the new safety system.

FIG. 3 shows another application scenario of the new safety system. The same reference signs again refer to the same parts and are not explained again hereinafter.

The exemplary embodiment according to FIG. 3 differs from the exemplary embodiment according to FIG. 2 in that instead of a safe camera system safety mats 54 are placed around the robot 14. Like the safe camera system before, the transport vehicle 36 can be identified and its position determined via the safety mats, in particular via safety mats having spatial resolution. Based on this information, the safety system 10 can control the monitoring of a hazardous area around the technical installation 12 as described above.

The autonomously operating technical unit can be identified in particular by weight determination or by means of a clear "footprint" of the unit 34; the safety mat sensors are particularly preferred in combination with the previously described safe camera unit in order to enable a precise and error-free evaluation.

Figure 4:
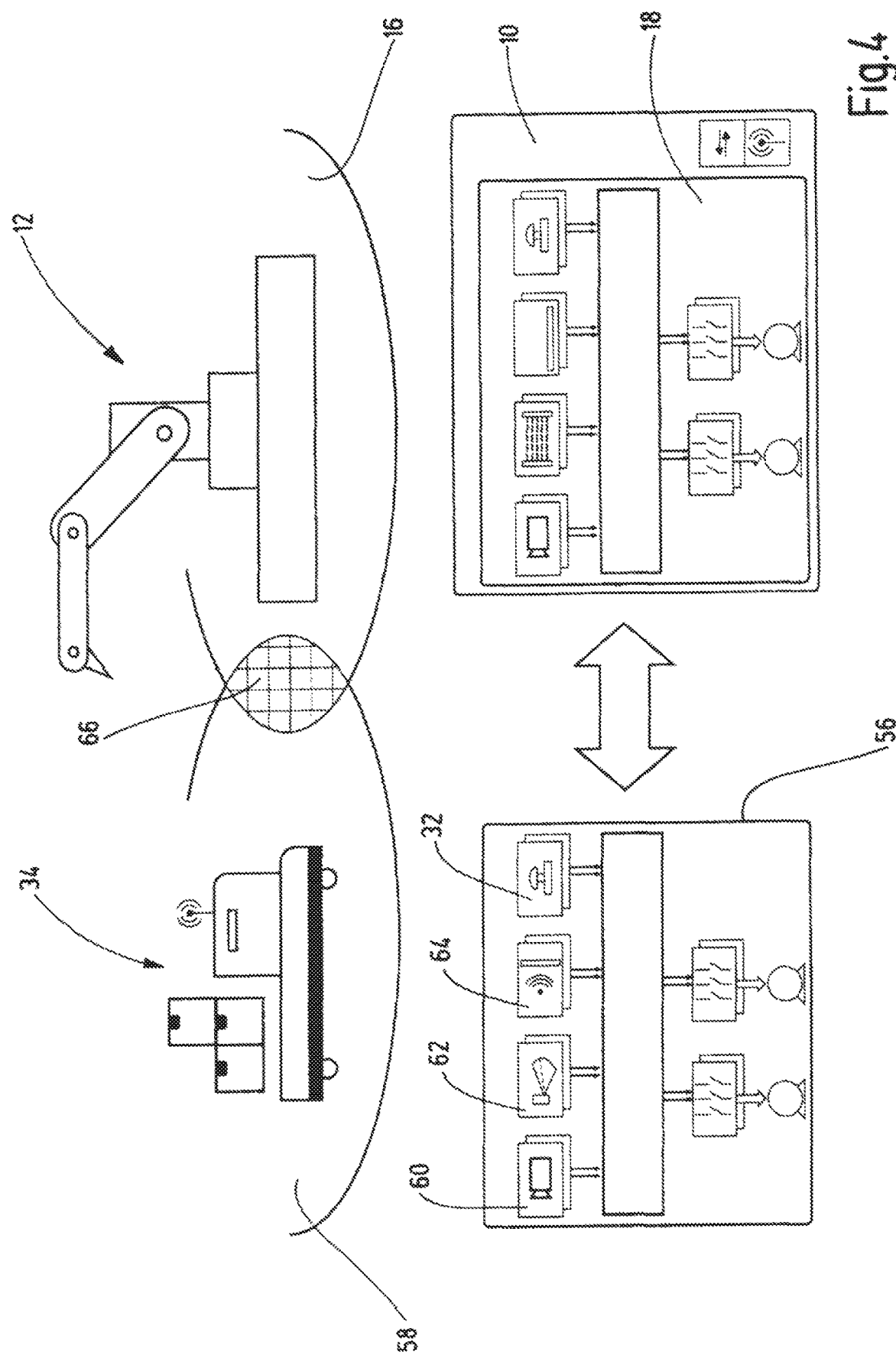
FIG. 4 illustrates a schematic representation of a preferred exemplary embodiment of the new safety system.

FIG. 4 shows a particularly preferred exemplary embodiment of the new safety system. The same reference signs again refer to the same parts.

The safety system 10 has a first safety-related device 18 which can be used to monitor a first hazardous area 16 of a technical installation 12 as described above. In addition, the safety system 10 is configured to cooperate with an autonomous technical unit 34. In particular, the safety system 10 is configured to cooperate with another safety-related device 56 of the autonomously operating technical unit 34.

In this exemplary embodiment, the autonomously operating technical unit 34 itself has a safety-related device 56 which can be used to safeguard its own hazardous area 58 surrounding the autonomously operating technical unit 34.

The second safety-related device 56 of autonomously operating technical unit 34 is therefore equipped in a similar manner to the first safety-related device 18 of the technical installation 12; the second safety-related device 56 has sensors which, individually or in combination via a corresponding control system, are linked to outputs in order to bring the autonomously operating technical unit 34 into a safe state in a hazardous situation.

Like the first safety-related device 18, the second safety-related device 56 has a multi-channel redundant design. For the example of driverless transport vehicles, the second safety-related device 56 may comprise, for example, personnel identification systems, special braking systems, warning devices and/or emergency stop devices. For example, a safe camera systems 60, laser scanners 62, radar distance sensors 64 or emergency stop switches 32 can be used as sensors or signaling devices.

The second safety-related device 56 safeguards the hazardous area 58 by immediately and safely stopping the transport vehicle 36 when a person is in the hazardous area 58 or an emergency stop switch 34 is pressed on the unit 34. The second safety-related device 58 acts directly on an emergency stop module independently of the respective vehicle control system and thus enables safe shutdown even if the vehicle control system fails. In addition, the second safety-related device 56 is independent of the first safety-related device 18. This means that the first safety-related device 18 and the second safety-related device 56 monitor their respective hazardous area 16, 58 independently of one another.

The preferred safety system 10 according to the exemplary embodiment of FIG. 4 is designed to coordinate the independently designed safety-related devices of the technical installation 12 and the autonomously operating technical unit 34. In other words, the safety system 10 according to the present exemplary embodiment is designed to cooperate dynamically with another safety-related device. For this purpose, an autonomously operating technical unit 34, as described above, can log on and register with the safety system 10, so that parts or all of the safety-related device 18 of the technical installation 12 can be deactivated and the autonomously operating technical unit 34 can operate freely in the hazardous area 16 of the technical installation 12.

Since, apart from any final safeguarding means, safety in the hazardous area 16 is limited by this measure, the safety system 10 is preferentially set up, in accordance with the exemplary embodiment of FIG. 4, to fall back on the sensors 60, 62, 64, 32 of the second safety-related device 56 of the autonomously operating technical unit 34 during the limitation to the sensors 60, 62, 64, 32. Despite the limitation of the first safety-related device 18, this measure can guarantee sufficient safety in the hazardous area 16.

Under certain circumstances, safety in the hazardous area 16 can even be further increased, since additional sensors are integrated into the overall system. Signaling devices such as the emergency stop buttons 32 of the autonomously operating unit 34 can also be used by the safety system 10, whereby actuation of the emergency stop button 32 affects the first safety-related device 18 of the technical installation 12. This means that while the second safety-related device 56 cooperates with the first safety-related device 18, actuating the emergency stop button 32 on the autonomously operating unit 34 can also cause the technical installation 12 to be switched off.

In a preferred exemplary embodiment, the safety system 10 can also be set up in such a way that a restriction of the first safety-related device 18 only occurs in an overlapping area 66 of the two overlapping hazardous areas 16, 58, and the monitoring is otherwise maintained.

In addition, the safety system 10 may itself also have safe outputs (not shown here) independent of the first safety-related device 18 with which the technical installation 12 can be brought into a safe state. Alternatively, however, the safety system 10 can also fall back on the first safety-related device 18 and the available means for bringing the technical installation 12 into the safe state. The latter enables the new safety system to be implemented advantageously as a distributed function within the first safety-related device 18.

By coordinating the two independent safety-related devices 18, 56, which are usually required for the corresponding systems, flexible and safe protection of the entire system can be achieved in a favorable manner and the resulting synergy effects can be exploited advantageously.

While the above exemplary embodiment are based on the cooperation of an autonomously operating technical unit with a technical installation, it is also conceivable that a person registers with the safety system as an autonomously operating unit by suitable means, for example by means of an RFID card. In this way, automated, coordinated operation can also be made possible with the operator of an installation.

Figure 5:
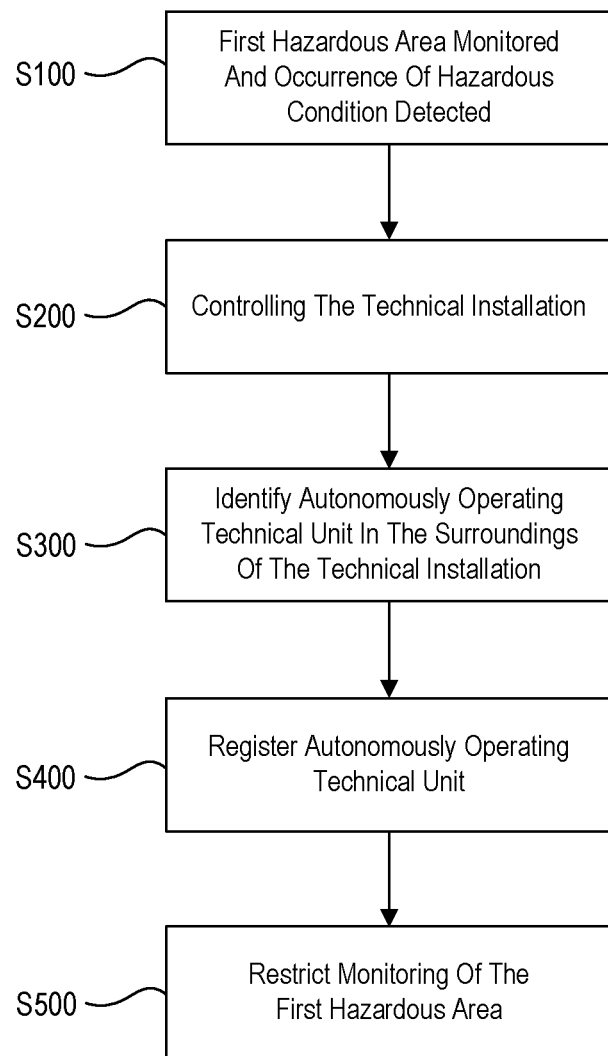
FIG. 5 illustrates a flow chart of an exemplary embodiment of the new method.

FIG. 5 shows in a flowchart an exemplary embodiment of the new method for safeguarding the cooperative operation of people, robots and machines with regard to a technical installation.

Starting point of the method is the provision of a first safety-related device for monitoring a first hazardous area of the technical installation.

In step S100 the hazardous area is monitored and the occurrence of a hazardous condition is detected. Monitoring is performed by the first safety-related device in known manner. A safety-related device can include various sensors such as: a three-dimensional safety camera system, close-range sensors (based on optical principles or radar technology), safety mats (with and without safe spatial resolution), laser scanners (individual and in a cluster), infrared monitoring, light barriers, radio localization or other contactless protective devices. It goes without saying that a combination of the aforementioned devices is also possible or the application of a sensor data fusion, in which the data of the individual sensors are linked and synthesized.

Preferably the sensors act independently of a controlling system of the technical system on a safety module, which is configured to bring the technical installation into a safe state in case of a hazardous situation, in particular to switch it off, as indicated here in step S200.

Step S300 involves identifying an autonomously operating technical unit in the surroundings of the technical installation. In this context, identification means detecting an autonomously operating technical unit in a defined area and assigning it to a defined group. If an assignment to a defined group cannot be made, the detected unit is treated as an unidentified unit and treated by the first safety-related device like any other object in the first hazardous area of the technical installation. A defined group can be a list of individual units or a type-related assignment. In other words, autonomously working technical units can be detected individually in an exemplary embodiment or in another exemplary embodiment based on their type.

After identification, the autonomously operating technical unit is registered in step S400 if it fulfills a defined condition. The registration thus preferably comprises an authentication process, whereby the autonomously operating technical unit logs on to the safety system, for example by processing an identifier of the autonomously operating technical unit in order to check whether the unit is authorized to be in the hazardous area of the technical installation. The defined condition is fulfilled, for example, if the identifier of the autonomously working technical unit is stored in a list or a defined logon procedure has been successfully executed.

In step S500, the first safety-related device restricts the monitoring of the first hazardous area in response to the registration of the autonomously operating technical unit. In other words, if an autonomously operating technical unit has been identified and has successfully registered with the safety system, it restricts the monitoring of the first hazardous area in an appropriate manner so that the autonomously operating technical unit can act in the first hazardous area. In particular, it is prevented that the unit acting autonomously in the first danger area triggers the safety function of the technical installation, which brings the technical installation into a safe state.

The restriction includes in particular a so-called muting in which sensors are specifically deactivated so that no reaction is triggered by them. In the case of a three-dimensional safety camera system, for example, this may mean that some areas that are being monitored by the system are no longer monitored during the restriction. Other areas, however, will continue to trigger the safety function if an unauthorized object is detected in these areas.

A restriction of monitoring is therefore preferably a partial deactivation of the safety function for defined areas from the entire area of protection covered by the sensors of the first safety-related device. In particularly preferred embodiments, the restriction of monitoring by the first safety-related device is compensated by additional monitoring by a second safety-related device of the autonomously operating technical unit. This enables flexible cooperation while maintaining a high safety level.

It goes without saying that the inventive method is not limited to the steps mentioned above and the order in which they are performed. In other exemplary embodiments, individual method steps can be more complex, involve additional steps, or be executed in a different order.

What is claimed is:

1. A safety system for safeguarding cooperative operation of people, robots, and machines with respect to a technical installation, the safety system comprising:
a first safety-related device configured to:
monitor a first hazardous area of the technical installation and
bring the technical installation into a safe state in response to detection of a hazardous condition,
wherein the safety system is configured to:
identify an autonomously operating technical unit,
register the autonomously operating technical unit in response to the autonomously operating technical unit satisfying a defined condition,
restrict monitoring of the first hazardous area by the first safety-related device in response to the registration, and
in response to a defined event:
revoke the registration of the autonomously operating technical unit and
lift the restriction on monitoring.

2. The safety system of claim 1, wherein:
the first safety-related device comprises sensor means for detecting persons in the first hazardous area and
the safety system is configured to identify the autonomously operating technical unit using the sensor means.

3. The safety system of claim 1, wherein the safety system is configured to assign with the identification an identifier to the autonomously operating technical unit.

4. The safety system of claim 1, wherein:
the safety system comprises a communication interface for communication with the autonomously operating technical unit and
the safety system is configured to receive an identifier of the autonomously operating technical unit via the communication interface to identify the autonomously operating technical unit.

5. The safety system of claim 4, wherein the communication interface is a wireless interface.

6. The safety system of claim 3, wherein the safety system is configured to check the defined condition using the identifier.

7. The safety system of claim 1, wherein the defined event is at least one of:
expiry of a defined time period,
a logoff of the autonomously operating technical unit from the safety system, and
a withdrawal of the autonomously operating technical unit from the first hazardous area of the technical installation.

8. The safety system of claim 1, wherein the autonomously operating technical unit comprises a second safety-related device configured to monitor a second hazardous area of the autonomously operating technical unit.

9. The safety system of claim 8, wherein the second safety-related device comprises at least one signaling device configured to signal a hazardous condition in the second hazardous area.

10. The safety system of claim 8, wherein:
the second safety-related device is configured to monitor the first hazardous area in response to the first safety-related device being restricted in monitoring the first hazardous area of the technical installation, and
the safety system is configured to, in response to a hazardous condition being detected, receive a signal representing the hazardous condition in the first hazardous area from the second safety-related device of the autonomously operating technical unit, in order to bring the technical installation into a safe state.

11. The safety system of claim 10, wherein the safety system comprises another safety-related device configured to bring the technical installation into a safe state.

12. The safety system of claim 10, wherein the safety system is configured to transmit the signal of the second safety-related device to the first safety-related device in order to transfer the technical installation into a safe state.

13. The safety system of claim 1, wherein the first safety-related device comprises at least one non-restrictable device that is configured to monitor the first hazardous area even after registration of the autonomously operating technical unit.

14. The safety system of claim 13, wherein the non-restrictable device is a tactile detection and/or near-field protection.

15. The safety system of claim 13, wherein the non-restrictable device is in an inactive state in response to there being no monitoring restrictions for the first safety-related device with respect to the first hazardous area.

16. The safety system of claim 1, wherein:
the first safety-related device is configured to divide the first hazardous area into a first area and a second area,
the safety system is configured to selectively restrict monitoring of the first hazardous area in the first area, and
the safety system is configured to selectively restrict monitoring of the first hazardous area in the second area.

17. The safety system of claim 16, wherein the safety system is configured to:
detect a position of the autonomously operating technical unit and
restrict the monitoring of the first hazardous area in the first area or in the second area depending on the position of the autonomously operating technical unit.

18. The safety system of claim 1, wherein the autonomously operating technical unit is a vehicle of an automated guided vehicle system (AGV).

19. The safety system of claim 1, wherein the autonomously operating technical unit is a person who can identify himself as an autonomously operating technical unit using technical means.

20. The safety system of claim 1, wherein the first safety-related device comprises at least one sensor, a switching device, and an actuator, which form a multi-channel.

21. The safety system of claim 1, wherein the safety system is designed as a logical function within a safety controller or as a distributed function of the first safety-related device.

22. A method for safeguarding cooperative operation of people, robots, and machines with respect to a technical installation, the method comprising:
monitoring a first hazardous area of the technical installation for a hazardous condition using a first safety-related device;
bringing the technical installation into a safe state in response to detection of the hazardous condition;
identifying an autonomously operating technical unit;
registering the autonomously operating technical unit in response to the autonomously operating technical unit satisfying a defined condition;
restricting monitoring of the first hazardous area by the first safety-related device in response to registration of the autonomous technical unit; and in response to a defined event:
  revoking the registration of the autonomously operating technical unit and
  lifting the restriction on monitoring.

23. A non-transitory computer readable storage medium encoded with instructions comprising:
  using a first safety-related device, monitoring a first hazardous area of a technical installation for a hazardous condition;
  bringing the technical installation into a safe state in response to detection of the hazardous condition;
  identifying an autonomously operating technical unit;
  registering the autonomously operating technical unit in response to the autonomously operating technical unit satisfying a defined condition;
  restricting monitoring of the first hazardous area by the first safety-related device in response to registration of the autonomously operating technical unit; and
  in response to a defined event:
    revoking the registration of the autonomously operating technical unit and
    lifting the restriction on monitoring.

* * * * *